United States Patent
Patel et al.

(10) Patent No.: US 10,448,405 B2
(45) Date of Patent: Oct. 15, 2019

(54) METHODS AND APPARATUS FOR MITIGATING RESOURCE CONFLICTS BETWEEN ULTRA LOW LATENCY (ULL) AND LEGACY TRANSMISSIONS

(71) Applicant: QUALCOMM Incorporated, San Diego, CA (US)

(72) Inventors: Shimman Arvind Patel, San Diego, CA (US); Wanshi Chen, San Diego, CA (US); Durga Prasad Malladi, San Diego, CA (US); Peter Gaal, San Diego, CA (US); Hao Xu, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 15/064,325

(22) Filed: Mar. 8, 2016

(65) Prior Publication Data
US 2016/0278070 A1 Sep. 22, 2016

Related U.S. Application Data

(60) Provisional application No. 62/135,590, filed on Mar. 19, 2015.

(51) Int. Cl.
*H04W 72/04* (2009.01)
*H04L 27/34* (2006.01)
(Continued)

(52) U.S. Cl.
CPC ......... *H04W 72/048* (2013.01); *H04L 5/0007* (2013.01); *H04L 5/0037* (2013.01);
(Continued)

(58) Field of Classification Search
CPC ............ H04W 72/048; H04W 72/042; H04W 72/0446; H04L 5/0037; H04L 5/0007; H04L 27/2601
See application file for complete search history.

(56) References Cited

U.S. PATENT DOCUMENTS 8,005,160 B2 * 8/2011 Steer ................... H04L 27/3488
370/334
8,559,343 B2 * 10/2013 Parkvall ............... H04B 7/2656
370/280
(Continued)

FOREIGN PATENT DOCUMENTS

WO WO-2008154506 A1 12/2008

OTHER PUBLICATIONS

Dola S., et al., "GRaTIS: Free Bits in the Network", IEEE Transactions On Mobile Computing, IEEE Service Center, Los Alamitos, CA, US, vol. 14, No. 1, Jan. 1, 2015 (Jan. 1, 2015), pp. 72-85, XP011566395, ISSN: 1536-1233, DOI: 10.1109/TMC.2013.24 [retrieved on Dec. 2, 2014].
(Continued)

Primary Examiner — Hashim S Bhatti
(74) Attorney, Agent, or Firm — Patterson & Sheridan, LLP

(57) ABSTRACT

Certain aspects of the present disclosure relate to methods and apparatus for mitigating resource conflicts between ultra low latency (ULL) and legacy transmissions. A base station may determine a region of a subframe having overlapping resource allocations for a first device of a first type (e.g., ULL device) and a second device of a second type (e.g., legacy device), wherein the first device of the first type has a capability to perform certain procedures with low latency relative to the second device of the second type that lacks the capability. The base station may modulate data from the region of the subframe for transmission to the first and the second devices, using a hierarchical modulation scheme.

27 Claims, 13 Drawing Sheets

(51) Int. Cl.
*H04L 5/00* (2006.01)
*H04L 27/26* (2006.01)

(52) U.S. Cl.
CPC ...... *H04L 27/3461* (2013.01); *H04L 27/3488* (2013.01); *H04W 72/042* (2013.01); *H04L 27/2604* (2013.01)

(56) References Cited

U.S. PATENT DOCUMENTS

| | | | | |
|---|---|---|---|---|
| 9,319,130 | B2* | 4/2016 | Parkvall | H04B 7/2643 |
| 9,749,999 | B2* | 8/2017 | ElArabawy | H04W 72/0413 |
| 2002/0186778 | A1 | 12/2002 | Agami et al. | |
| 2006/0198454 | A1* | 9/2006 | Chung | H04L 25/0202 375/260 |
| 2007/0275669 | A1* | 11/2007 | Rietman | H04W 28/06 455/70 |
| 2011/0205995 | A1* | 8/2011 | Grovlen | H04L 5/0007 370/329 |

OTHER PUBLICATIONS

Morello A., et al., "DVB-S2: The Second Generation Standard for Satellite Broad-Band Services", Proceedings of the IEEE, vol. 94, No. 1, Jan. 1, 2006 (Jan. 1, 2006), pp. 210-227, XP055117799, ISSN: 0018-9219, DOI: 10.1109/JPROC.2005.861013.
Partial International Search Report—PCT/US2016/021450—ISA/EPO—dated May 31, 2016.
Perotti A.G., et al., "Downlink Overloaded Multiple Access Based on Constellation Expansion", 2014 IEEE Globecom Workshops (GC WKSHPS), IEEE, Dec. 8, 2014 (Dec. 8, 2014), pp. 977-982, XP032747912, DOI: 10.1109/GLOCOMW.2014.7063560 [retrieved on Mar. 18, 2015].
International Search Report and Written Opinion—PCT/US2016/021450—ISA/EPO—dated Aug. 18, 2016.
Panasonic: "Enhanced HARQ Method with Signal Constellation Rearrangement", 3GPP Draft, R1-01-0237, 3rd Generation Partnership Project (3GPP), Mobile Competence Centre, 650, Route Des Lucioles, F-06921 Sophia-Antipolis Cedex, France, vol. RAN WG1, No. Las Vegas, 20010223, Feb. 23, 2001 (Feb. 23, 2001), pp. 1-11, XP050094504, [retrieved on Feb. 23, 2001].

* cited by examiner

FIG. 13

METHODS AND APPARATUS FOR MITIGATING RESOURCE CONFLICTS BETWEEN ULTRA LOW LATENCY (ULL) AND LEGACY TRANSMISSIONS

The present Application for Patent claims priority to U.S. provisional Application No. 62/135,590, entitled "METHODS AND APPARATUS FOR MITIGATING RESOURCE CONFLICTS BETWEEN ULTRA LOW LATENCY (ULL) AND LEGACY TRANSMISSIONS," filed Mar. 19, 2015, and assigned to the assignee hereof and hereby expressly incorporated by reference herein.

FIELD

The present disclosure relates generally to wireless communication, and more particularly, to methods and apparatus for mitigating resource conflicts between ultra low latency (ULL) and legacy transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Aspects of the present disclosure provide a method for wireless communications by a base station. The method generally includes determining a region of a subframe having overlapping resource allocations for a first device of a first type and a second device of a second type, wherein the first device of the first type has a capability to perform certain procedures with low latency relative to the second device of the second type that lacks the capability, and modulating data from the region of the subframe for transmission to the first and the second devices, using a hierarchical modulation scheme.

Aspects of the present disclosure provide a method for wireless communications by a first device of a first type. The method generally includes receiving resource allocation of a second device of a second type, wherein the first device of the first type has a capability to perform certain procedures with low latency relative to the second device of the second type that lacks the capability, determining a region of a subframe having overlapping resource allocations for the first device and the second device, based on the received resource allocation of the second device, receiving data using resources allocated in the region of the subframe, and attempting to decode the data based on the determination, wherein the data was modulated using a hierarchical modulation scheme.

Aspects of the present disclosure provide a method for wireless communications by a base station. The method generally includes determining that a first transmission for a first device of a first type and a second transmission for a second device of a second type are mapped to a same resource element, wherein the first type of device has a capability to perform certain procedures with low latency relative to the second type of device that lacks the capability, and jointly adjusting soft symbol log likelihood ratio (LLR) strengths of the first and second transmissions to determine a third transmission to be transmitted using the resource element.

Aspects of the present disclosure provide an apparatus for wireless communications by a base station. The apparatus generally includes at least one processor and a memory coupled to the at least one processor. The at least one processor is generally configured to determine a region of a subframe having overlapping resource allocations for a first device of a first type and a second device of a second type, wherein the first device of the first type has a capability to perform certain procedures with low latency relative to the second device of the second type that lacks the capability, and modulate data from the region of the subframe for transmission to the first and the second devices, using a hierarchical modulation scheme.

Aspects of the present disclosure provide a first device of a first type. The first device generally includes at least one processor and a memory coupled to the at least one processor. The at least one processor is generally configured to receive resource allocation of a second device of a second type, wherein the first device of the first type has a capability to perform certain procedures with low latency relative to the second device of the second type that lacks the capability, determine a region of a subframe having overlapping resource allocations for the first device and the second device, based on the received resource allocation of the second device, receive data using resources allocated in the region of the subframe, and attempt to decode the data based on the determination, wherein the data was modulated using a hierarchical modulation scheme.

Aspects of the present disclosure provide an apparatus for wireless communications by a base station. The apparatus generally includes at least one processor and a memory coupled to the at least one processor. The at least one processor is generally configured to determine that a first transmission for a first device of a first type and a second transmission for a second device of a second type are mapped to a same resource element, wherein the first type of device has a capability to perform certain procedures with low latency relative to the second type of device that lacks the capability, and jointly adjust soft symbol log likelihood ratio (LLR) strengths of the first and second transmissions to determine a third transmission to be transmitted using the resource element.

Aspects of the present disclosure provide an apparatus for wireless communications by a base station. The apparatus generally includes means for determining a region of a subframe having overlapping resource allocations for a first device of a first type and a second device of a second type, wherein the first device of the first type has a capability to perform certain procedures with low latency relative to the second device of the second type that lacks the capability, and means for modulating data from the region of the subframe for transmission to the first and the second devices, using a hierarchical modulation scheme.

Aspects of the present disclosure provide an apparatus for wireless communications by a first device of a first type. The apparatus generally includes means for receiving resource allocation of a second device of a second type, wherein the first device of the first type has a capability to perform certain procedures with low latency relative to the second device of the second type that lacks the capability, means for determining a region of a subframe having overlapping resource allocations for the first device and the second device, based on the received resource allocation of the second device, means for receiving data using resources allocated in the region of the subframe, and means for attempting to decode the data based on the determination, wherein the data was modulated using a hierarchical modulation scheme.

Aspects of the present disclosure provide an apparatus for wireless communications by a base station. The apparatus generally includes means for determining that a first transmission for a first device of a first type and a second transmission for a second device of a second type are mapped to a same resource element, wherein the first type of device has a capability to perform certain procedures with low latency relative to the second type of device that lacks the capability, and means for jointly adjusting soft symbol log likelihood ratio (LLR) strengths of the first and second transmissions to determine a third transmission to be transmitted using the resource element.

Aspects of the present disclosure provide a computer-readable medium for wireless communications by a base station. The computer-readable medium generally includes instructions which when executed by a computer performs a method comprising determining a region of a subframe having overlapping resource allocations for a first device of a first type and a second device of a second type, wherein the first device of the first type has a capability to perform certain procedures with low latency relative to the second device of the second type that lacks the capability, and modulating data from the region of the subframe for transmission to the first and the second devices, using a hierarchical modulation scheme.

Aspects of the present disclosure provide a computer-readable medium for wireless communications by a base station. The computer-readable medium generally includes instructions which when executed by a computer performs a method comprising receiving resource allocation of a second device of a second type, wherein the first device of the first type has a capability to perform certain procedures with low latency relative to the second device of the second type that lacks the capability, determining a region of a subframe having overlapping resource allocations for the first device and the second device, based on the received resource allocation of the second device, receiving data using resources allocated in the region of the subframe, and attempting to decode the data based on the determination, wherein the data was modulated using a hierarchical modulation scheme.

Aspects of the present disclosure provide a computer-readable medium for wireless communications by a base station. The computer-readable medium generally includes instructions which when executed by a computer performs a method comprising determining that a first transmission for a first device of a first type and a second transmission for a second device of a second type are mapped to a same resource element, wherein the first type of device has a capability to perform certain procedures with low latency relative to the second type of device that lacks the capability, and jointly adjusting soft symbol log likelihood ratio (LLR) strengths of the first and second transmissions to determine a third transmission to be transmitted using the resource element.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-whitespace), etc.

BRIEF DESCRIPTION OF THE DRAWINGS

FIG. 13 illustrates constellation diagrams for 16QAM symbols showing boundaries for each of the four bits transmitted in an RE where the computed LLR is zero, in accordance with certain aspects of the present disclosure.

DETAILED DESCRIPTION

Figure 1:
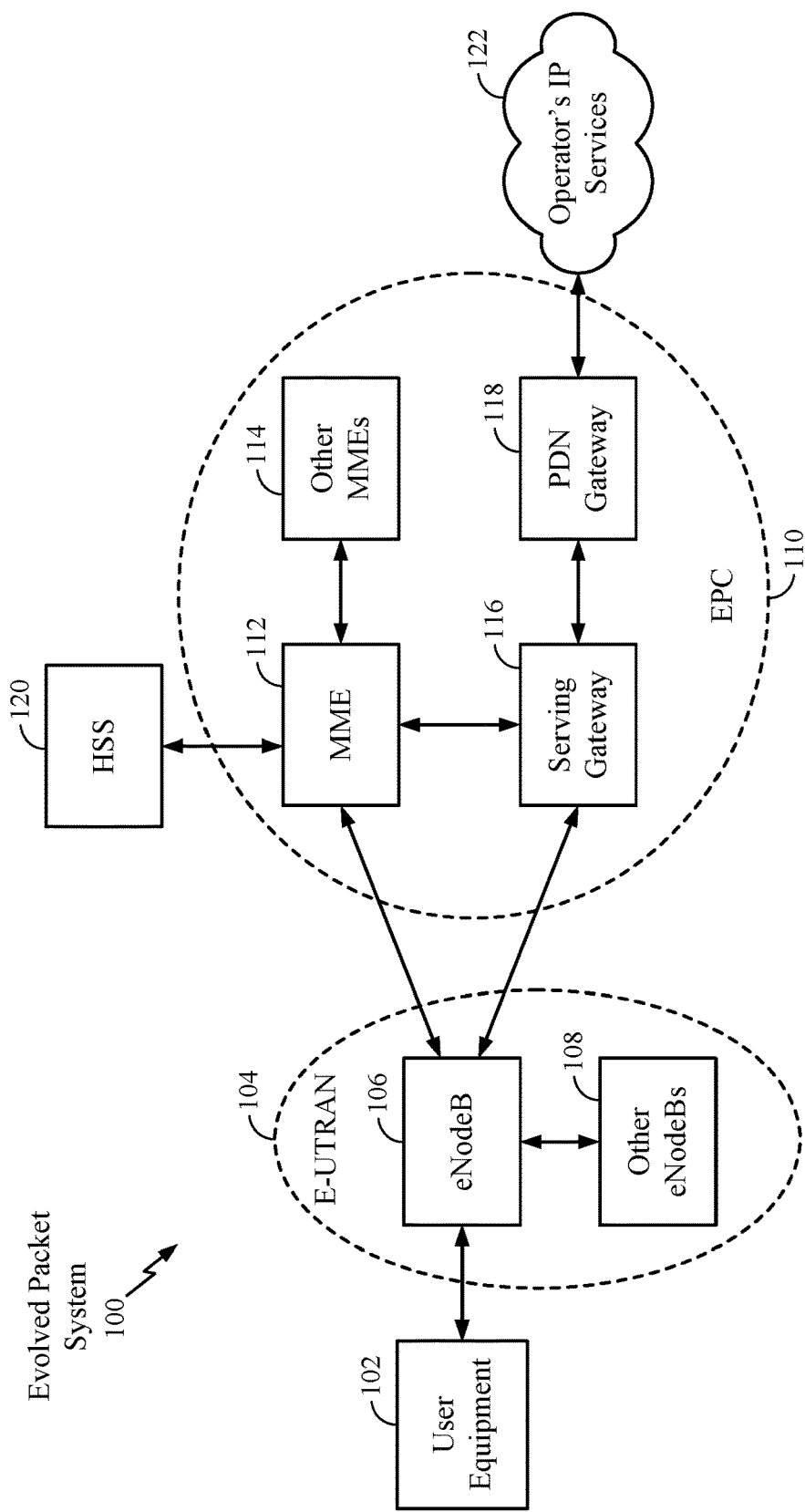
FIG. 1 is a diagram illustrating an example of a network architecture.

In certain aspects, certain devices may support low latency (or ultra low latency "ULL") capability, including the capability to perform certain procedures with low latency relative to devices that lack the capability (e.g., "legacy" devices). Resources allocated to ULL and legacy devices may overlap. Certain aspects of the present disclosure provide techniques for transmission of legacy and ULL data in regions of overlapping legacy and ULL resource allocations by maintaining acceptable quality for both legacy and ULL transmissions in the overlapping region.

One technique may include modulating and transmitting data from the region of overlapping resource allocations using a hierarchical modulation scheme. This scheme may include using a higher order modulation scheme for transmission of a combined signal set for ULL and legacy transmissions, relative to the modulation schemes used for individually transmitting ULL and legacy signals. Further, the signal set may be parameterized by a scaling factor which moves constellation points of a modulation quadrant away from the constellation points of other quadrants, thus decreasing noise and bit error rates.

Another technique to mitigate effects of overlapping ULL and legacy resource allocations may include using modulation symbol remapping for transmission of data from a region of overlapping resource allocation. The remapping may include jointly adjusting soft symbol log likelihood ratio (LLR) strengths of the ULL and legacy transmissions to determine a third transmission to be transmitted using the overlapping resource.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, application specific integrated circuits (ASICs), digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

For example, a base station (e.g., 106, 108 etc.) may determine a region of a subframe having overlapping resource allocations for a ULL device (e.g., UE 102) and a legacy device (e.g., another UE not shown in the figure), and modulate data from the region of the subframe for transmission to the ULL and legacy devices using a hierarchical modulation scheme. Further, a ULL device (e.g., UE 102) may receive resource allocation of a legacy device (e.g. another UE) and may determine the region of the subframe having overlapping ULL and legacy resource allocations, based on the received resource allocation of the legacy device. The ULL device may receive data using resources allocated in the region of the subframe, and attempt to decode the data which was modulated by the base station using the hierarchical modulation scheme.

In alternative aspects, the base station (e.g., 106, 108 etc.) may determine that a first transmission for a ULL device (e.g., UE 102) a second transmission for a legacy device (e.g., another UE) are allocated to a same resource element, and in response, jointly adjust soft symbol LLR strengths of the first and second transmissions to determine a third transmission to be transmitted using the resource element.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot/robotic device, a wearable device (e.g., smart watch, smart glasses, smart goggle, heads-up displays, smart bracelets, smart wristbands, smart clothing, etc.), a vehicular device, a sensor, a monitor, a meter, or any other similar functioning device. Some UEs may be considered machine-type communication(s) (MTC) UEs, which may include remote devices, that may communicate with a base station, another remote device, or some other entity. MTC may refer to communication involving at least one remote device on at least one end of the communication and may include forms of data communication which involve one or more entities that do not necessarily need human interaction. Some UEs may be MTC UEs. Examples of MTC UEs include sensors, meters, monitors, location tags, drones, trackers, robots/robotic devices, etc. MTC UEs may include UEs that are capable of MTC communications with MTC servers and/or other MTC devices through Public Land Mobile Networks (PLMN), for example. Some MTC UEs, as well as other UEs, may be implemented as internet of things (IoT) devices (e.g., narrowband IoT (NB-IoT) devices) or internet of everything (IoE) devices. A UE may also be referred to by those skilled in the art as a mobile station, a subscriber station, a station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an 51 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
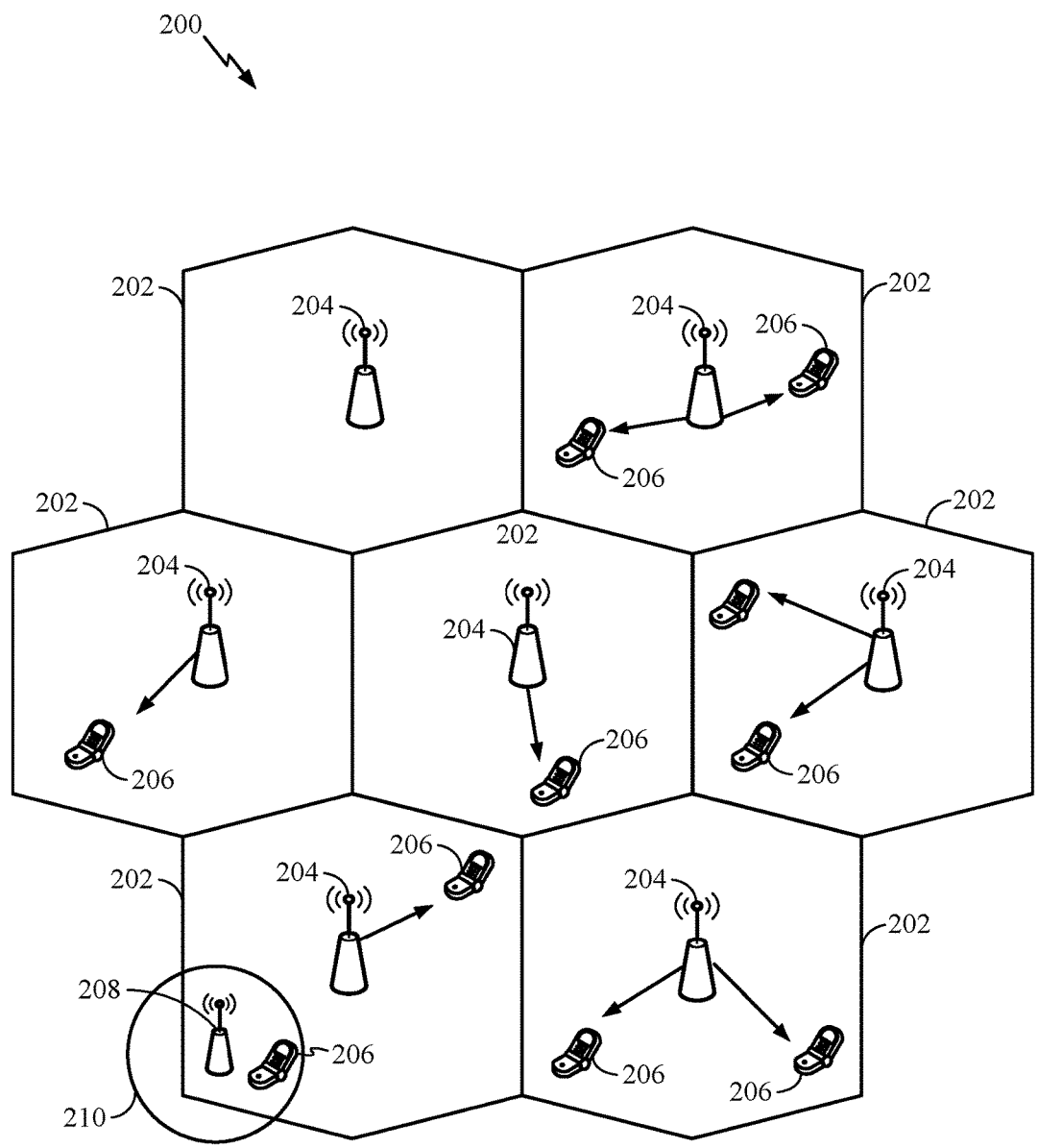
FIG. 2 is a diagram illustrating an example of an access network.

FIG. 2 is a diagram illustrating an example of an access network 200 in an LTE network architecture in which aspects of the present disclosure may be practiced. For example, eNBs 204 and UEs 206 may be configured to implement techniques for hierarchical modulation of data or remapping of modulation symbols from a region of overlapping ULL and legacy allocation, in accordance with certain aspects of the present disclosure as discussed below.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
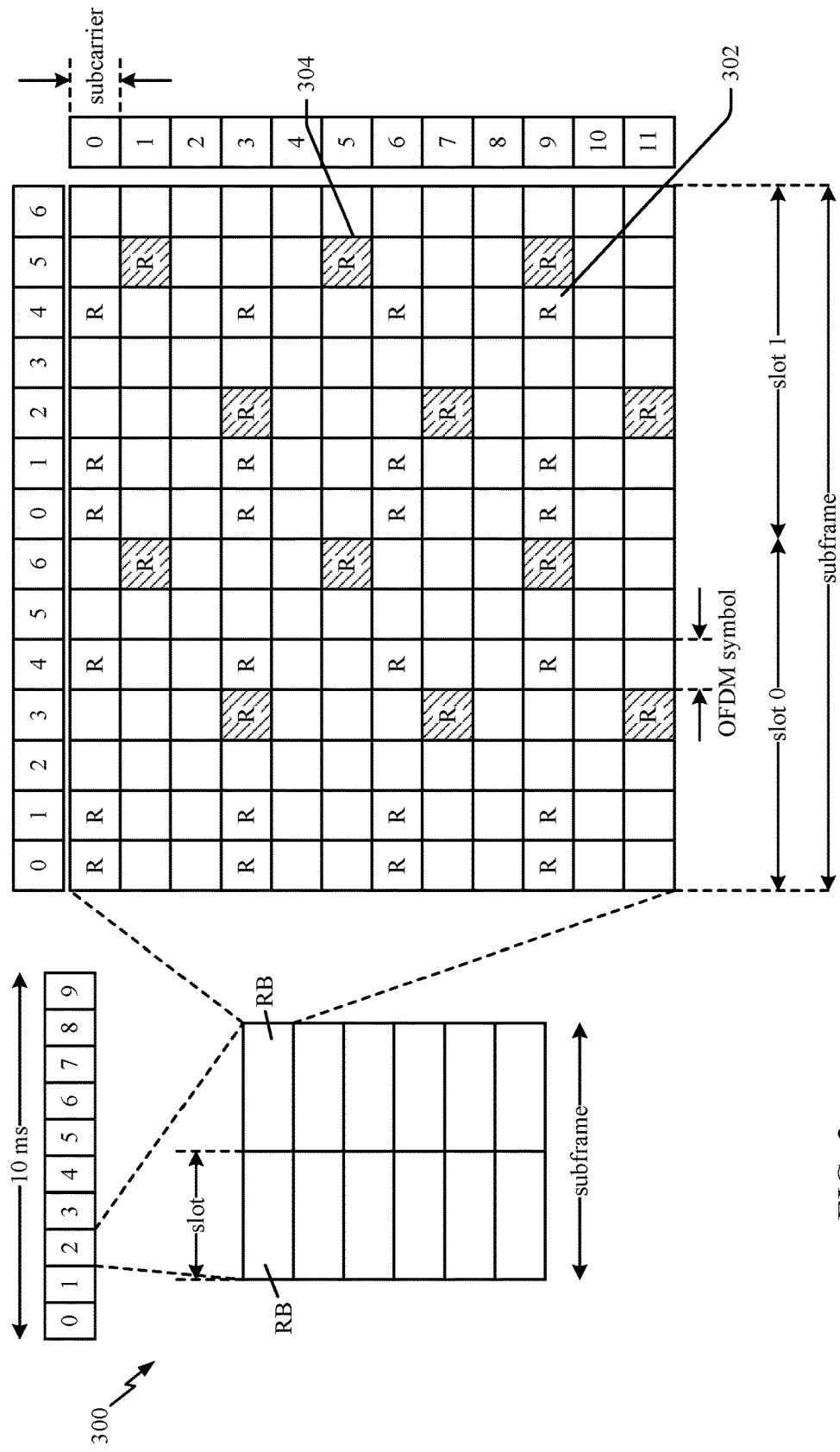
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
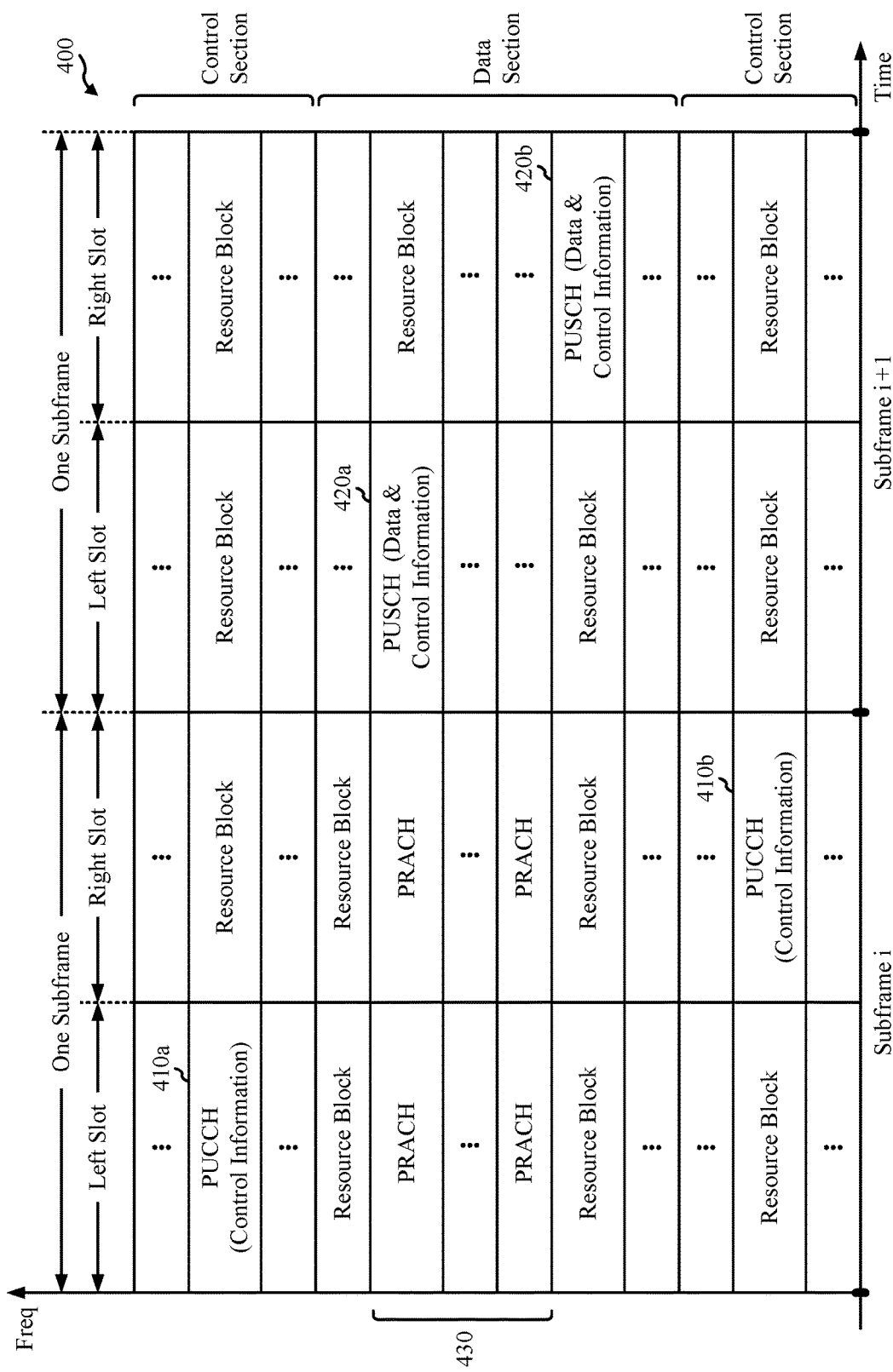
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
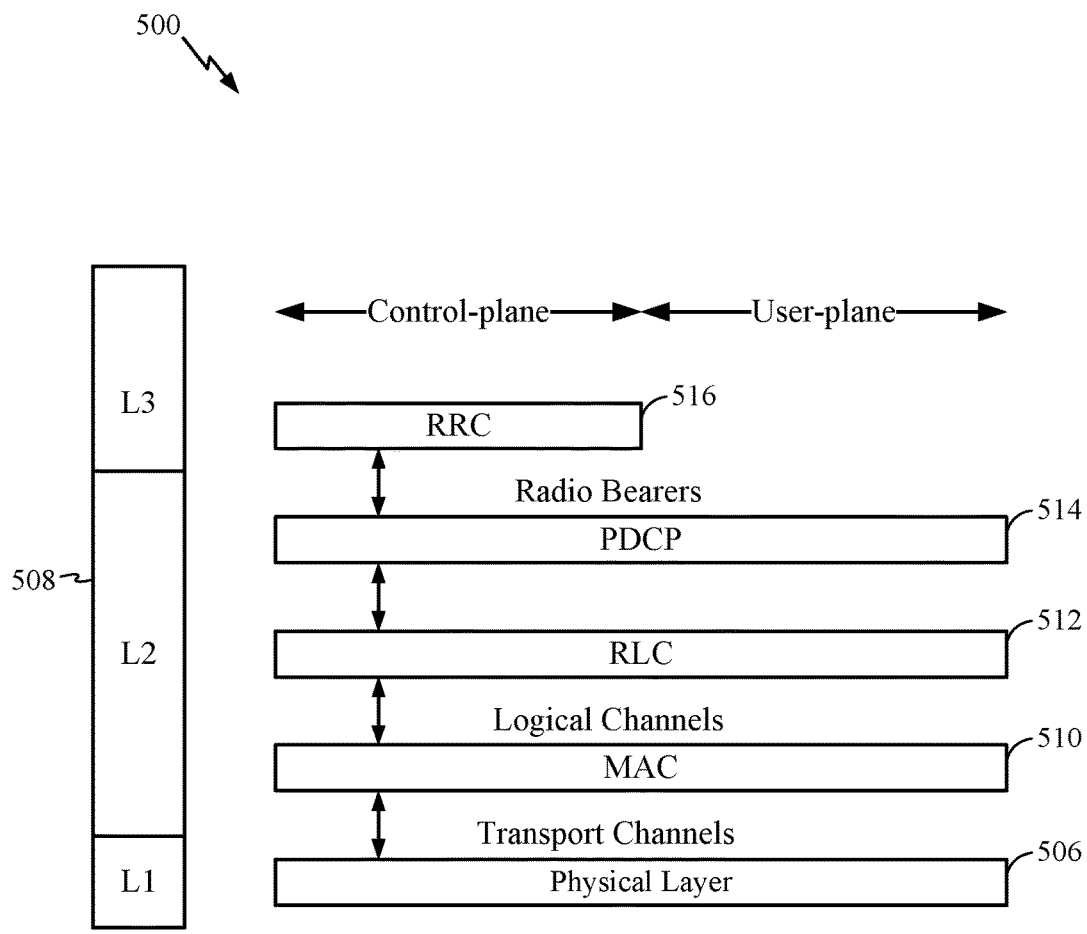
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
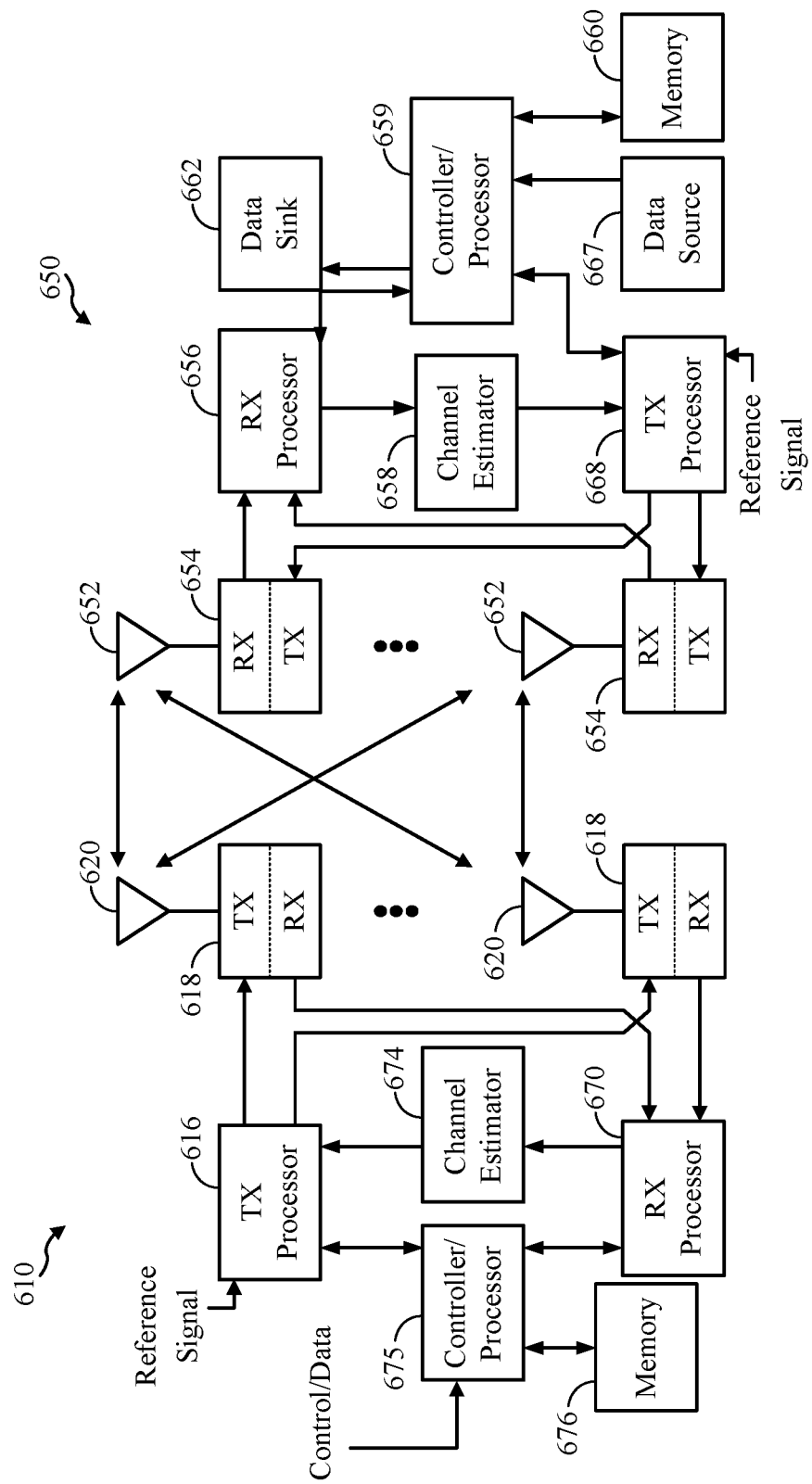
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

For example, eNB 610 may determine a region of a subframe having overlapping resource allocations for a UE 650 (e.g., a ULL device) and a legacy device (e.g., another UE not shown in the figure), and modulate data from the region of the subframe for transmission to the ULL and legacy devices using a hierarchical modulation scheme. Further, UE 650 may receive resource allocation of a legacy device (e.g. another UE), for example from the eNB 610, and may determine the region of the subframe having overlapping ULL and legacy resource allocations, based on the received resource allocation of the legacy device. The UE 650 may receive data using resources allocated in the region of the subframe, and attempt to decode the data which was modulated by the base station using the hierarchical modulation scheme.

In alternative aspects, the eNB 610 may determine that a first transmission for a ULL device (e.g., UE 650) a second transmission for a legacy device (e.g., another UE) are allocated to a same resource element, and in response, jointly adjust soft symbol LLR strengths of the first and second transmissions to determine a third transmission to be transmitted using the resource element.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 8:
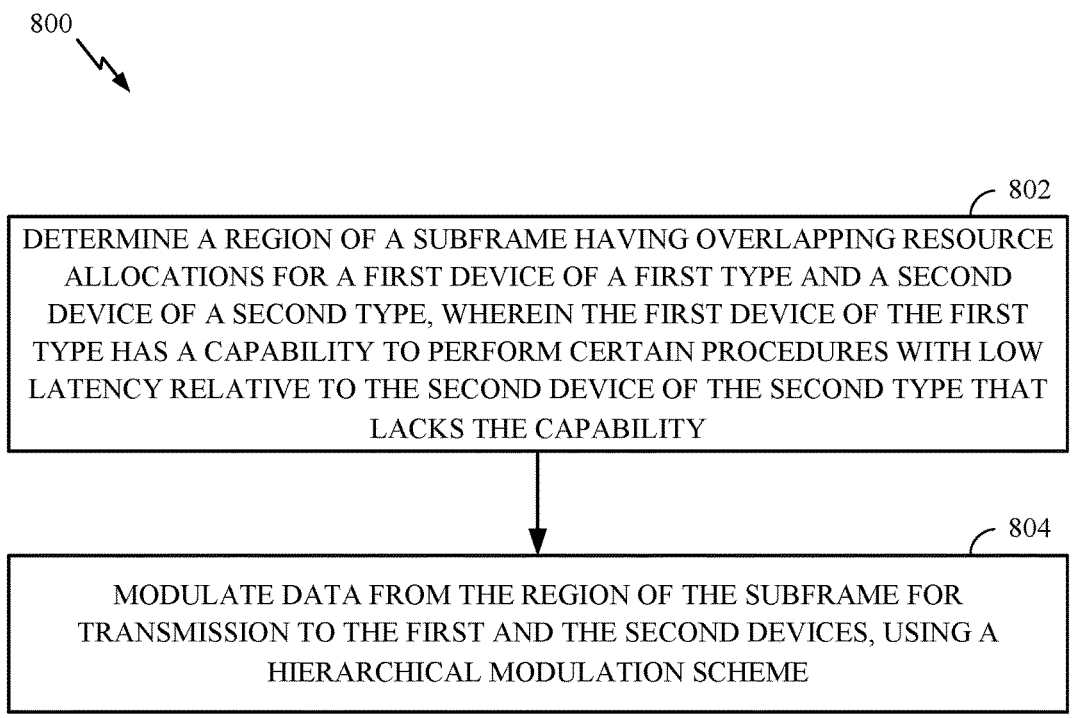
FIG. 8 illustrates example operations, for example by a base station, for transmission of data using hierarchical modulation scheme, in accordance with certain aspects of the present disclosure.
Figure 12:
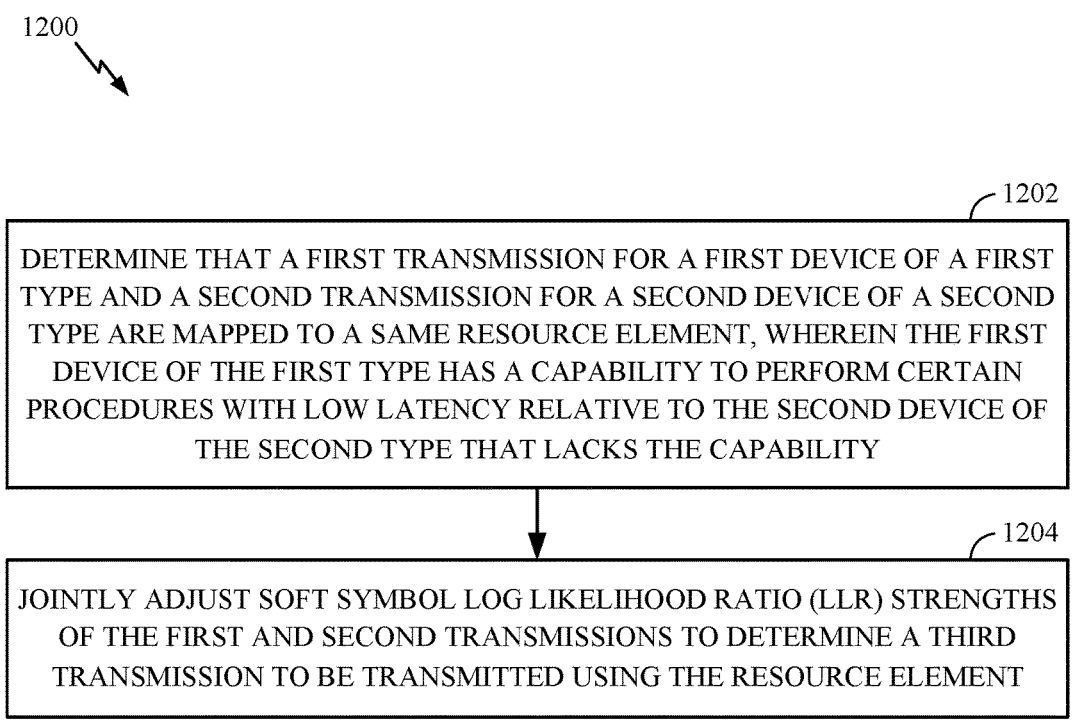
FIG. 12 illustrates example operations, for example by a base station, for transmission of data using modulation symbol remapping, in accordance with certain aspects of the present disclosure.

The controller/processor 675 and/or other processors and modules at the eNB 610 may perform or direct operations, for example, operations 800 in FIG. 8, operations 1200 in FIG. 12, and/or other processes for the techniques described herein for transmission of data from regions of overlapping ULL and legacy resource allocations. The controller/processor 659 and/or other processors and modules at the UE 650 may perform or direct operations, for example, operations 900 in FIG. 9, and/or other processes for the techniques described herein for receiving and processing data in regions of overlapping ULL and legacy resource allocations. In certain aspects, one or more of any of the components shown in FIG. 6 may be employed to perform example operations 800, 900 and 1200 and/or other processes for the techniques described herein. The memories 660 and 676 may store data and program codes for the UE 650 and eNB 610 respectively, accessible and executable by one or more other components of the UE 650 and the eNB 610.

Example Techniques for Mitigating Resource Conflicts Between Ultra Low Latency (ULL) and Legacy Transmissions According to certain aspects presented herein, one or more devices (e.g., mobile station, base station, relay, etc.) in a wireless communication network (e.g., networks 100 and 200 as illustrated in FIGS. 1 and 2) may support one or more enhanced capabilities.

For example, in one aspect, a UE and/or eNB may support a low latency (or ultra low latency "ULL") capability. As used herein, the term ultra low latency capability generally refers to the capability to perform certain procedures with low latency relative to devices that lack the capability (e.g., so called "legacy" devices). In one implementation, the ULL capability may refer to the ability to support transmission time interval (TTI) periods around 0.1 ms or less (with 1 ms corresponding to a conventional LTE subframe duration). However, it should be noted that, in other implementations, the ULL capability may refer to other low latency periods.

In general, however, the one or more enhanced capabilities may refer to other capabilities such as, advanced antenna configurations, coordinated multipoint (CoMP) transmission and reception, advanced interference management techniques, and the like.

In certain aspects, resources (e.g., time and frequency resources as shown in FIG. 3) may have to be shared between two or more devices (e.g., a ULL device and a legacy device). It may not always be possible to schedule ULL resources around legacy resources, and thus, sometimes the ULL and legacy resource allocations will overlap. A straight forward technique to handle such overlapping ULL and legacy resource allocations is to transmit legacy signals punctured with ULL signals, for example, by replacing at least some legacy bits with ULL bits. However, such puncturing may lead to degradation of legacy transmission quality. Certain aspects of the present disclosure provide techniques for transmission of legacy and ULL data in regions of overlapping legacy and ULL resource allocations by maintaining acceptable quality for both legacy and ULL transmissions in the overlapping region.

In certain aspects of the present disclosure, a hierarchical modulation scheme (or superposition coding scheme) may be defined to convey transmissions for two sets of users (e.g., one based on subframe based legacy transmission and other based on symbol based ULL transmission) on the same resource elements of a subframe. Thus, the hierarchical modulation scheme may be used for overlapping legacy subframe and ULL symbol allocations. In an aspect, the hierarchical modulation scheme transmits a signal set that is a product of legacy and ULL signal sets. This may be done by using a higher order modulation scheme for transmission of data from a region of the subframe having overlapping legacy and ULL resource allocations, relative to modulation schemes used for exclusive legacy and ULL transmissions, for example, modulation schemes used for transmissions from regions of the subframe allocated exclusively for legacy or ULL. As an example, if each of legacy and ULL transmissions uses QPSK in non-overlapping regions of the subframe, 16 QAM may be used in the overlapping region for transmission of an expanded signal set which is a product of the legacy and ULL signal sets.

Figure 7:
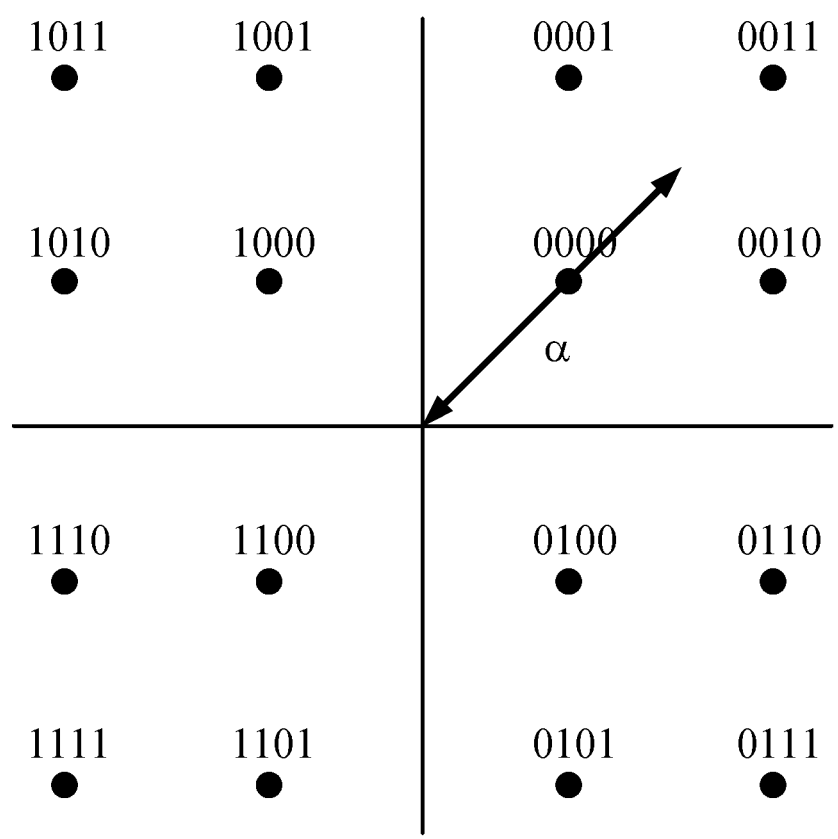
FIG. 7 illustrates a constellation diagram for a 16 QAM scheme used for hierarchical modulation in accordance with certain aspects of the present disclosure.

FIG. 7 illustrates a constellation diagram for a 16 QAM used for hierarchical modulation in accordance with certain aspects of the present disclosure. In certain aspects, a base layer may be defined with the first two MSBs (most significant bits) of the 4-tuple mapped to a legacy device. An extension layer may be defined with the last two LSBs (least significant bits) of the 4-tuple mapped to a ULL device. The two MSBs decide which quadrant the legacy user gets its bits from, and the two LSBs decide the placement of the ULL bits within the quadrant. For example, for a value of "0010", the first two bits "00" mapped to the legacy user indicate the top right quadrant of the constellation, and the last two bits "10" mapped to the ULL user indicate the placement of its bits within the quadrant.

In certain aspects, as shown in FIG. 7, the signal set transmitted from the overlapping region of the subframe may be parameterized by a scaling factor (shown as a in FIG. 7). As shown in FIG. 7, the scaling factor a pushes each cluster of four constellation points in the modulation quadrants out by a factor of a, thus reducing noise and bit error rates. However, in an aspect, relative distances between constellation points within a modulation quadrant remain the same. Thus, the parameter a governs performance for both the base layer and the extension layer. In an aspect, an eNB may transmit a value of the scaling factor used for a hierarchical modulation scheme to a device for use in demodulation by the device.

In certain aspects, the above configuration makes hierarchical modulation transparent to the legacy user, regardless of the a modulation parameter. For example, in a case when the legacy user is using QPSK and 16QAM constellation is transmitted using hierarchical modulation, by mapping the base layer (2 MSB bits) to the legacy user, the legacy user knows which quadrant it gets its bits from and the hierarchical modulation does not affect the legacy user at all, regardless of alpha parameterization (e.g., choice of a modulation parameter). Thus, the legacy users do not need to know the change in modulation structure or the a modulation parameter. However, the ULL user is required to know the a parameterization in order to create correct bit log likelihood ratios (LLRs) of the two LSBs mapped to the ULL user.

It may be noted that the above 16 QAM example is used for exemplary and illustrative purposes only. The hierarchical modulation scheme may be applied using any other higher order modulation scheme including 64 QAM, 256 QAM etc.

It may be noted that there is a SNR tradeoff between the base and extension layers as a function of a. For example, for lower values of a, required SNR of the extension layer increases. Further, the hierarchical modulation may be power inefficient. For large overlap regions, a base station may have to backoff power to accommodate hierarchical modulation in order to not saturate the power amplifier (PA) for larger a values chosen. Thus, in certain aspects, overlap regions of legacy and ULL allocations may be minimized while limiting use of the hierarchical modulation technique to only the intersection of REs where legacy and ULL allocations overlap.

Further, in an aspect, for the legacy signal to be backward compatible regardless of the choice of the a modulation parameter, the legacy signal must be mapped to the base layer with QPSK modulation. Any other configuration may require the legacy user needing to know the value of a, and the modulation structure change in the overlap region will no more be transparent to the legacy user.

In certain aspects, in order to use hierarchical modulation, information needs to be conveyed to the ULL user so that the ULL user can recover signals modulated using the hierarchical modulation. For example, the ULL user needs to know resource allocation for the legacy user so that it may determine the resources over which its ULL resource allocation overlaps with legacy resource allocation and that hierarchical modulation scheme was used. A special uPDCCH channel is generally used using unused CCEs of legacy PDCCH in the legacy control region to allocate uPDSCH resources for ULL users. In certain aspects, an additional DCI format may be defined for the uPDCCH in order to transmit resource allocation of legacy users to the ULL users. This format may be same as type 0 allocation. For example, for a 20 MHz/100 RB channel, 25 bits may be used to indicate legacy usage in groups of 4 RBs. In an aspect, any legacy allocation that uses any part of a 4 RB allocation will have that corresponding bit set. In an aspect, the new DCI format specifies the combined usage of all legacy users. In an aspect, the new DCI format indicates the resource allocation of a device with a granularity of an integer number of resource blocks (RBs).

In certain aspects, the ULL users, based on determining legacy resource allocation from the uPDCCH, may either decide to rate match around legacy users or receive ULL bits on an extension layer on intersecting REs between legacy and ULL.

FIG. 8 illustrates example operations 800, for example by a base station, for transmission of data using hierarchical modulation scheme, in accordance with certain aspects of the present disclosure. Operations 800 begin, at 802, by determining a region of a subframe having overlapping resource allocations for a first device of a first type and a second device of a second type, wherein the first type of device has a capability to perform certain procedures with low latency relative to the second type of device that lacks the capability. At 804, the base station modulates data from the region of the subframe for transmission to the first and the second devices using a hierarchical modulation scheme.

Figure 9:
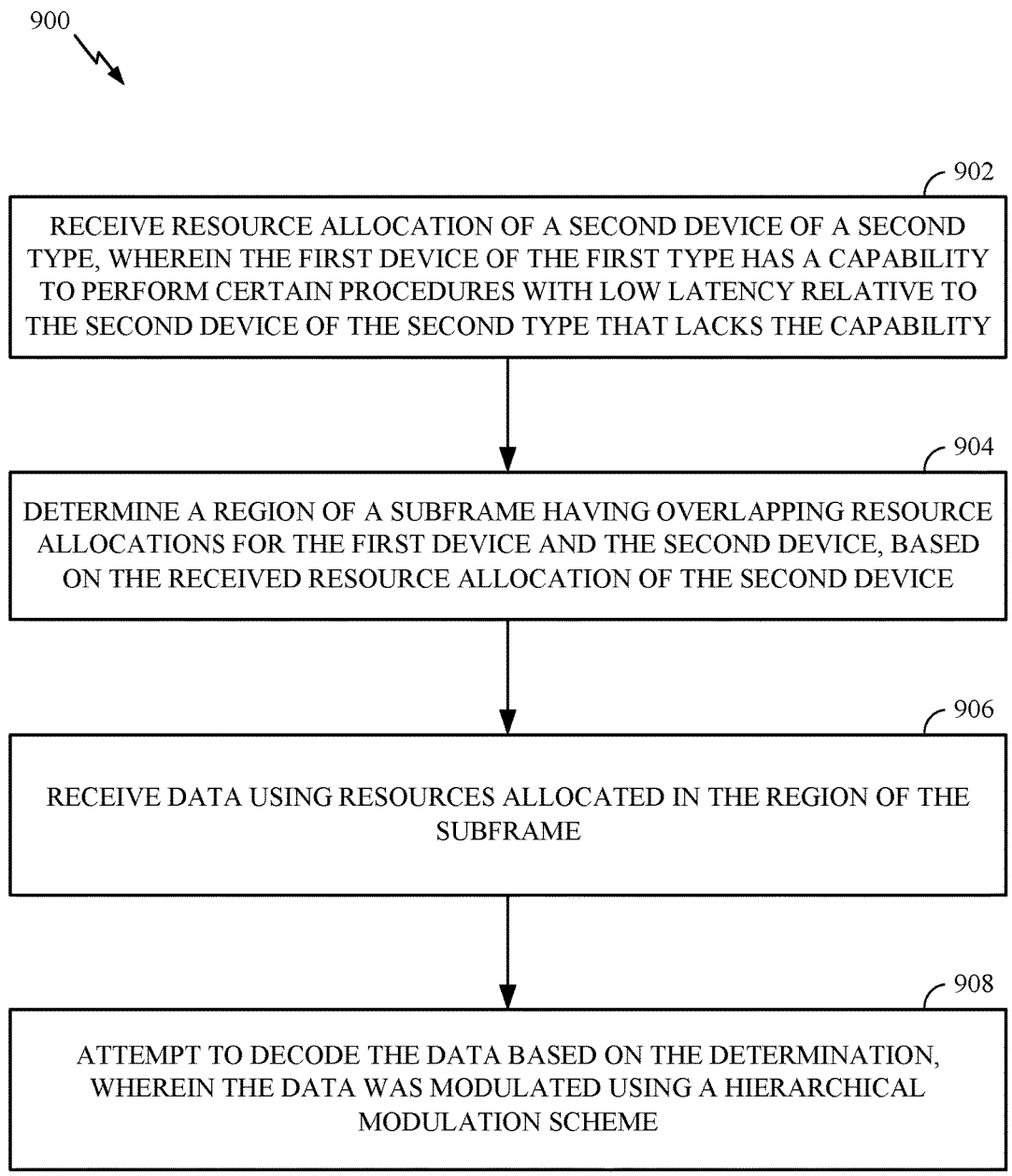
FIG. 9 illustrates example operations, for example by a first device of a first type, for receiving data modulated using a hierarchical modulation scheme, in accordance with certain aspects of the present disclosure.

FIG. 9 illustrates example operations 900, for example by a first device of a first type, for receiving data modulated using a hierarchical modulation scheme, in accordance with certain aspects of the present disclosure. Operations 900 begin, at 902, by receiving resource allocations of a second device of a second type, wherein the first type of device has a capability to perform certain procedures with low latency relative to the second type of device that lacks the capability. At 904, the first device determines a region of a subframe having overlapping resource allocations for the first device and the second device, based on the received resource allocation of the second device. At 906, the first device receives data using resources allocated in the region of the subframe. At 908, the first device attempts to decode the data based on the determination, wherein the data was modulated using a hierarchical modulation scheme.

Figure 10:
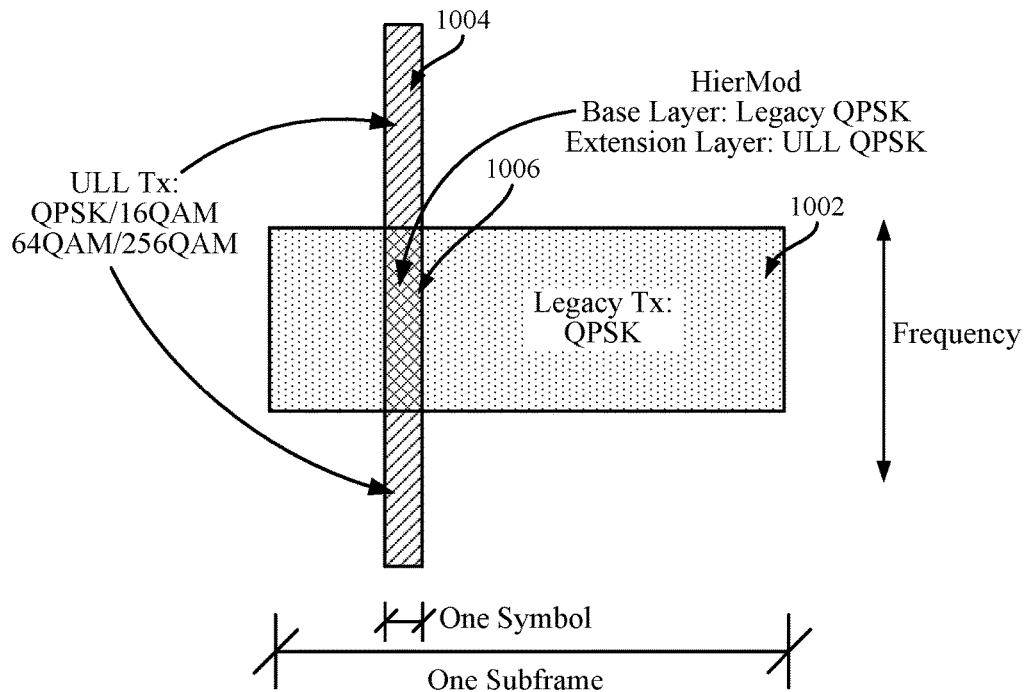
FIG. 10 illustrates overlapping legacy and ULL resource allocations, in accordance with certain aspects of the present disclosure.

FIG. 10 illustrates overlapping legacy and ULL resource allocations, in accordance with certain aspects of the present disclosure. As shown in FIG. 10, region 1002 is allocated for legacy transmissions over an entire subframe length, and region 1004 is allocated for ULL transmissions over a symbol length. As shown, the legacy and ULL resource allocations overlap at region 1006. As discussed above, hierarchical modulation may be employed for transmission of data from the region 1006 of overlapping legacy and ULL allocations. While only QPSK may be used for legacy transmissions, any modulation scheme including QPSK, 16QAM, 64QAM, or 256QAM may be used for ULL transmission from outside region 1006. In an aspect, for the hierarchical modulation technique in intersecting REs of the region 1006, both the base layer and extension layer are tuned to QPSK.

Figure 11:
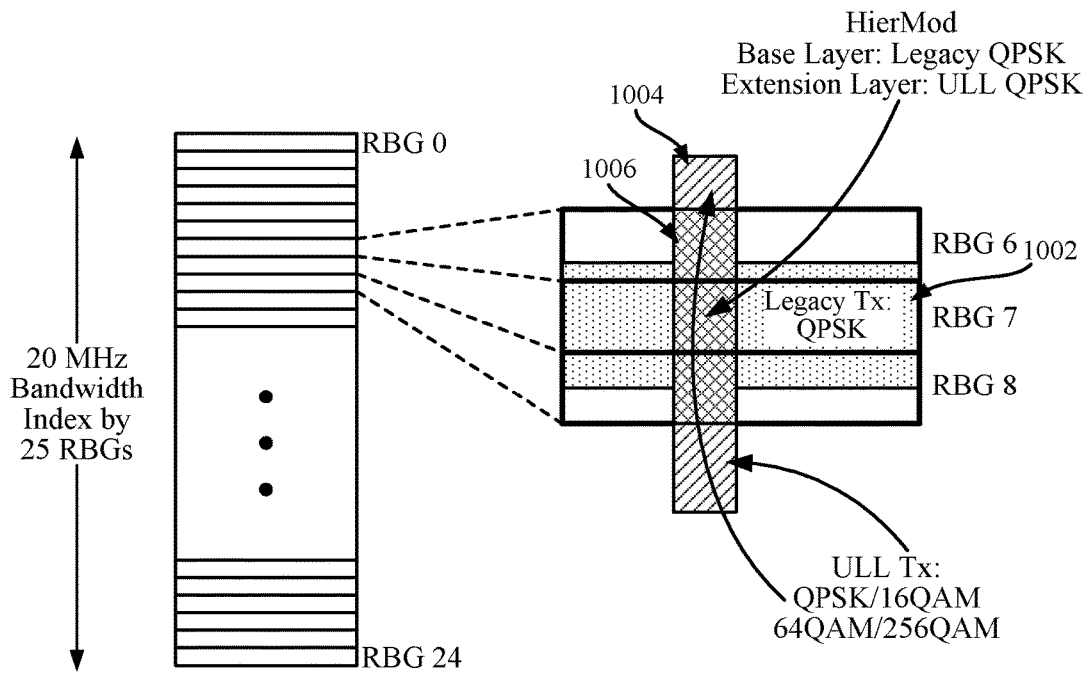
FIG. 11 illustrates conveying legacy resource allocation in groups of four RBs (four RB groups (RBGs)), in accordance with certain aspects of the present disclosure.

In certain aspects, for a 20 MHz bandwidth, about 100 bits may be needed to convey legacy resource allocation (e.g., PDSCH RBs) with the finest granularity. However, as noted above, since only 25 bits are used to convey the legacy resource allocation, the resource allocation may only be conveyed in groups of four RB groups (RBGs). Thus, the legacy transmission may not fully align with the RBG boundary. FIG. 11 illustrates conveying legacy resource allocation in groups of four RBs (RBGs), in accordance with certain aspects of the present disclosure. As shown in FIG. 11, while only parts of RBGs 6 and 8 carry legacy PDSCH, the bitmap sent in the PDCCH (e.g., for ULL users) may indicate the entire RBGs 6 and 8 are allocated for legacy transmission. Thus, as shown in FIG. 11, the actual legacy transmissions do not fully align with the RBG boundaries of RBGs 6 and 8.

In certain aspects, as discussed above hierarchical modulated transmission requires legacy transmission to be QPSK. In an aspect, to ease this restriction, additional bits may be added to PDCCH to indicate per RBG three possible choices including, no legacy usage, legacy usage but rate match around (allows legacy to use modulation beyond QPSK), or legacy usage with hierarchical modulation (legacy must use QPSK modulation). In an aspect, a simple alternative is to ensure that higher order modulated legacy users and ULL users use disjoint REs.

Modulation Symbol Remapping

As discussed above, a straight forward technique to handle overlapping ULL and legacy resource allocations is to puncture ULL REs into legacy REs. However, this technique completely wipes out the legacy bits being punctured and replaces them with ULL bits. As noted above, such puncturing may lead to degradation of legacy transmission quality. In certain aspects, when one or both of the ULL and legacy devices having overlapping resource allocations are tuned to a higher order modulation scheme, for example 16QAM, a generalization of the idea of puncturing ULL users into legacy REs may be used, for example, including puncturing/erasure insertion at the bit level instead of the RE level. This technique may be referred to as modulation symbol remapping.

According to this technique, given a particular RE with overlapping legacy and ULL allocation, the bit LLRs may be optimized by adjusting the modulation symbol constellation point. For example, given four bit allocations for legacy and ULL in the same RE, a final modulation point for transmission in the RE may be remapped that tries to optimize bit LLRs across legacy and ULL transmissions, without completely replacing legacy RE with ULL RE. In a way, this is soft puncturing at the bit level.

FIG. 12 illustrates example operations 1200, for example by a base station, for transmission of data using modulation symbol remapping, in accordance with certain aspects of the present disclosure. Operations 1200 begin, at 1202, by determining that a first transmission for a first device of a first type and a second transmission for a second device of a second type are mapped to a same resource element, wherein the first type of device has a capability to perform certain procedures with low latency relative to the second type of device that lacks the capability. At 1204, the base station jointly adjusts soft symbol LLR strengths of the first and second transmissions to determine a third transmission to be transmitted using the resource element.

Figure 13:
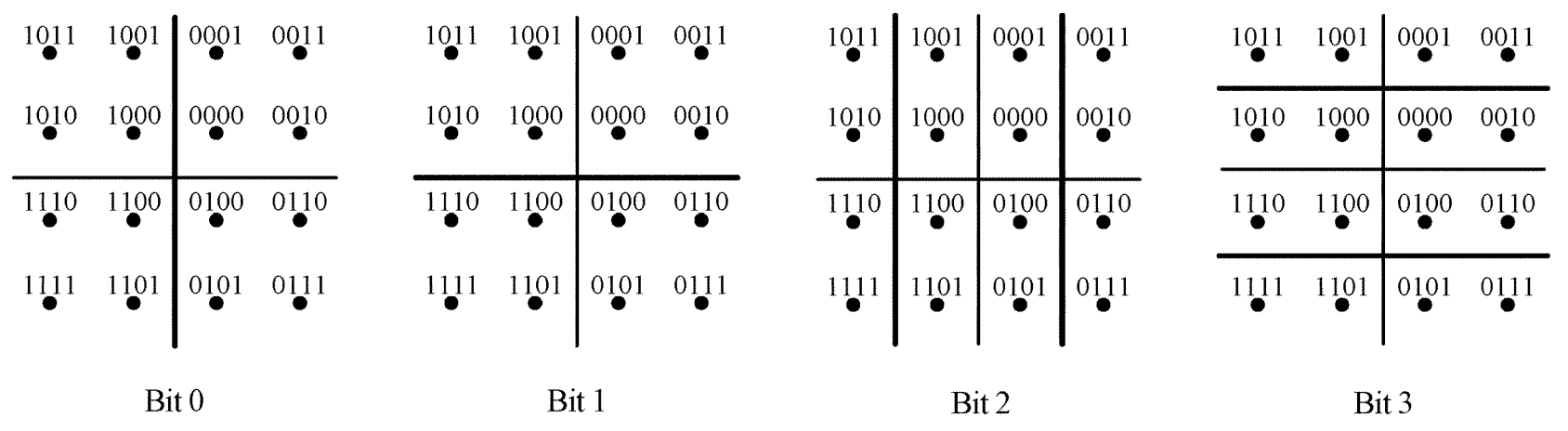

FIG. 13 illustrates constellation diagrams for 16 QAM symbols showing boundaries for each of the four bits transmitted in an RE where the computed LLR is zero, in accordance with certain aspects of the present disclosure. When demodulating (e.g., the 16QAM modulated symbols as shown in FIG. 13), a decoder performs an LLR calculation based on the position of each bit within the constellation. The dark solid lines in each of the constellations indicate what a decoder will consider an even split between a 0 and 1, for each bit.

Figure 14:
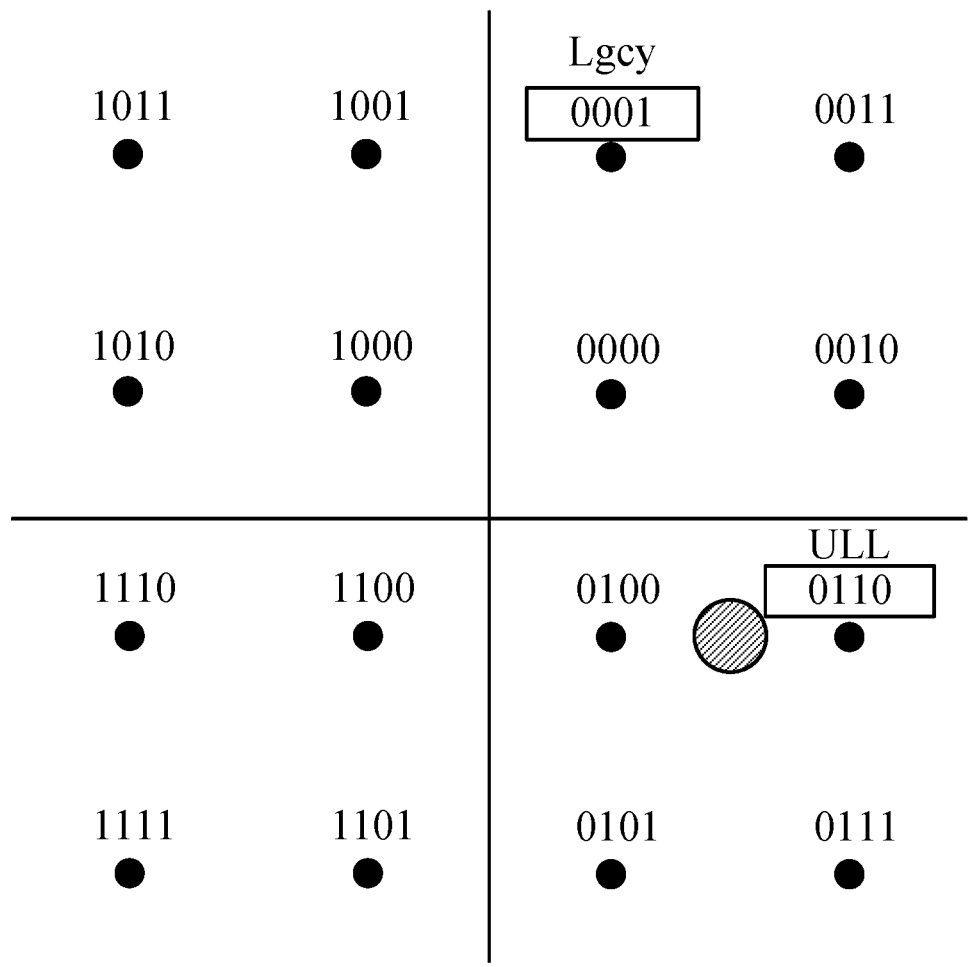
FIG. 14 illustrates an example modulation symbol remapping, in accordance with certain aspects of the present disclosure.

FIG. 14 illustrates an example modulation symbol remapping, in accordance with certain aspects of the present disclosure. As shown in FIG. 14, the ULL transmission is 0110 and the legacy transmission is 0001, both assigned to the same RE. Given the ULL and legacy transmissions, the soft symbol LLR strengths of the ULL and legacy transmissions may be jointly adjusted to determine a transmission (shown as big dot in FIG. 14) to be transmitted in the RE to the ULL and legacy devices. As shown in FIG. 14, this transmission may not be one of the 16QAM constellation points.

In certain aspects, a base station may adjust the soft symbol LLR strengths based on apriori knowledge of performances of previous transmissions to the ULL and legacy devices. For example, the base station may look aggregation levels, coding rates etc., were used for previous transmissions to the devices, and also determine past performance of the transmissions at these levels based on CRC pass rates.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication by a base station, comprising:
   determining a region of a subframe having overlapping resource allocations for a first device of a first type and a second device of a second type, wherein the first device of the first type has a capability to perform certain procedures with low latency relative to the second device of the second type that lacks the capability; and
   modulating data from the region of the subframe for transmission to the first and the second devices, using a hierarchical modulation scheme, wherein the hierarchical modulation scheme comprises using a higher order modulation scheme for transmission of data from the region with the overlapping resource allocations, relative to one or more modulation schemes used for transmission of data in one or more regions of the subframe having one or more resource allocations exclusively for the first or the second device.

2. The method of claim 1, wherein the second device is tuned to QPSK modulation scheme.

3. The method of claim 1, wherein using the higher order modulation scheme for transmission of the data comprises transmitting a signal set that is a combination of signal sets of the first and second devices.

4. The method of claim 3, wherein the signal set is parameterized by a scaling factor which moves constellation points of a modulation quadrant away from the constellation points of other modulation quadrants, while maintaining relative distances between constellation points within the modulation quadrant.

5. The method of claim 4, further comprising transmitting a value of the scaling factor used for the hierarchical modulation scheme to the first device for use in demodulation by the first device.

6. The method of claim 1, wherein modulating the data using the hierarchical modulation scheme comprises:
   mapping a set of bits of data defined as a base layer to the second device, the set of bits indicating a modulation quadrant; and
   mapping a remaining set of bits of the data defined as an extension layer to the first device, the remaining set of bits indicating placement of data bits within the modulation quadrant.

7. The method of claim 1, further comprising:
   transmitting resource allocation of the second device to the first device.

8. The method of claim 7, wherein transmitting the resource allocation comprises transmitting a control channel that generally carries resource allocation for the first device, according to a new DCI format to carry the resource allocation of the second device.

9. The method of claim 8, wherein the new DCI format indicates the resource allocation of the second device with a granularity of an integer number of resource blocks (RBs).

10. The method of claim 1, wherein the hierarchical modulation scheme is transparent to the second device.

11. A method for wireless communication by a first device of a first type, comprising:
   receiving resource allocation of a second device of a second type, wherein the first device of the first type has a capability to perform certain procedures with low latency relative to the second device of the second type that lacks the capability;
   determining a region of a subframe having overlapping resource allocations for the first device and the second device, based on the received resource allocation of the second device;
   receiving data using resources allocated in the region of the subframe; and
   attempting to decode the data based on the determination, wherein the data was modulated using a hierarchical modulation scheme by using a higher order modulation scheme for modulating the data received in the region of the subframe having the overlapping resource allocations, relative to one or more modulation schemes used for modulating data from one or more regions of the subframe having one or more resource allocations exclusively for the first or the second device.

12. The method of claim 11, wherein receiving the data using the resources allocated in the region of the subframe comprises receiving a signal set that is a combination of signal sets of the first and second devices, the combination generated based on the higher order modulation scheme.

13. The method of claim 12, wherein the signal set is parameterized by a scaling factor which moves constellation points of a modulation quadrant away from the constellation points of other modulation quadrants, while maintaining relative distances between constellation points within the modulation quadrant.

14. The method of claim 13, further comprising receiving information indicating a value of the scaling factor.

15. The method of claim 13, wherein:
   a set of bits of data defined as a base layer indicates a modulation quadrant; and
   a remaining set of bits of the data defined as an extension layer indicates placement of data bits within the modulation quadrant.

16. The method of claim 15, wherein attempting to decode the data comprises:
   determining the modulation quadrant based on the set of bits; and
   determining placement of the data bits within the modulation quadrant based on the remaining set of bits and the received value of the scaling factor.

17. The method of claim 11, wherein receiving resource allocation of the second device comprises receiving a control channel, that generally carries resource allocation for the first device, according to a new downlink control information (DCI) format carrying the resource allocation of the second device.

18. The method of claim 17, wherein the new DCI format indicates the resource allocation of the second device with a granularity of an integer number of resource blocks (RBs).

19. A method for wireless communication by a base station, comprising:
   determining that a first transmission for a first device of a first type and a second transmission for a second device of a second type are mapped to a same resource element, wherein the first type of device has a capability to perform certain procedures with low latency relative to the second type of device that lacks the capability; and
   jointly adjusting soft symbol log likelihood ratio (LLR) strengths of the first and second transmissions to determine a third transmission to be transmitted using the resource element.

20. The method of claim 19, wherein jointly adjusting the LLR strengths of the first and second transmissions comprises adjusting the LLR strengths on a per bit basis.

21. The method of claim 20, wherein jointly adjusting the LLR strengths of the first and second transmissions comprises adjusting the LLR strength of at least one bit of the first and second transmissions.

22. The method of claim 19, wherein the third transmission comprises a constellation point which is not from a set of constellation points of a modulation scheme used for the transmission.

23. The method of claim 19, wherein the jointly adjusting the soft symbol LLR strengths is based on apriori knowledge of performances of previous transmissions to the first and second devices.

24. A first device of a first type, comprising:
   at least one processor configured to:
      receive resource allocation of a second device of a second type, wherein the first device of the first type has a capability to perform certain procedures with low latency relative to the second device of the second type that lacks the capability;
      determine a region of a subframe having overlapping resource allocations for the first device and the second device, based on the received resource allocation of the second device;
      receive data using resources allocated in the region of the subframe; and
      attempt to decode the data based on the determination, wherein the data was modulated using a hierarchical modulation scheme by using a higher order modulation scheme for modulating the data received in the region of the subframe having the overlapping resource allocations, relative to one or more modulation schemes used for modulating data from one or more regions of the subframe having one or more resource allocations exclusively for the first or the second device; and
   a memory coupled to the at least one processor.

25. The first device of claim 24, wherein the at least one processor is configured to receive a signal set that is a combination of signal sets of the first and second devices, the combination generated based on the higher order modulation scheme.

26. The first device of claim 25, wherein the signal set is parameterized by a scaling factor which moves constellation points of a modulation quadrant away from the constellation points of other modulation quadrants, while maintaining relative distances between constellation points within the modulation quadrant.

27. The first device of claim 26, wherein:
   a set of bits of data defined as a base layer indicates a modulation quadrant; and
   a remaining set of bits of the data defined as an extension layer indicates placement of data bits within the modulation quadrant.

* * * * *